US011881359B2

(12) United States Patent
Kartalov et al.

(10) Patent No.: US 11,881,359 B2
(45) Date of Patent: Jan. 23, 2024

(54) 3D-PRINTABLE ARTIFICIAL MUSCLES BASED ON MICROFLUIDIC MICROCAPACITORS

(71) Applicant: THE UNITED STATES OF AMERICA, AS REPRESENTED BY THE SECRETARY OF THE NAVY, Arlington, VA (US)

(72) Inventors: Emil Paskalev Kartalov, Pacific Grove, CA (US); Michelangelo Coltelli, Marina, CA (US); Jeffrey Catterlin, Salinas, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 259 days.

(21) Appl. No.: 17/376,068

(22) Filed: Jul. 14, 2021

(65) Prior Publication Data

US 2022/0016760 A1  Jan. 20, 2022

Related U.S. Application Data

(60) Provisional application No. 63/051,443, filed on Jul. 14, 2020.

(51) Int. Cl.
*H01G 5/16* (2006.01)
*H01G 5/40* (2006.01)
*B25J 9/10* (2006.01)
*H01G 5/38* (2006.01)

(52) U.S. Cl.
CPC .............. *H01G 5/16* (2013.01); *B25J 9/1075* (2013.01); *H01G 5/40* (2013.01); *H01G 5/38* (2013.01)

(58) Field of Classification Search
None
See application file for complete search history.

(56) References Cited

U.S. PATENT DOCUMENTS

| 6,530,217 | B1 * | 3/2003 | Yokota | H01J 41/18 60/326 |
|---|---|---|---|---|
| 2007/0170822 | A1 * | 7/2007 | Pei | H10N 30/206 310/800 |
| 2013/0301101 | A1 * | 11/2013 | Conrad | G02B 26/0825 359/291 |

FOREIGN PATENT DOCUMENTS

JP  2002217060 A  *  8/2002  .............. H01G 5/16

* cited by examiner

*Primary Examiner* — Eric W Thomas
(74) *Attorney, Agent, or Firm* — Naval Postgraduate School; Scott Bell

(57) ABSTRACT

A microcapacitor array for providing artificial muscles is described. The microcapacitor array includes a dielectric body with electrode chambers, positive electrodes in positive electrode chambers, the positive electrodes being connected by a first set of channels in the dielectric frame; negative electrodes in negative electrode chambers, the negative electrodes being connected by a second set of channels in the dielectric frame. The first and second set of channels are arranged so that application of a voltage differential between the positive electrodes and the negative electrodes generates an attractive force between each set of adjacent positive and negative electrodes.

18 Claims, 3 Drawing Sheets

3D-PRINTABLE ARTIFICIAL MUSCLES BASED ON MICROFLUIDIC MICROCAPACITORS

CROSS-REFERENCE TO RELATED APPLICATIONS

This patent application is a non-provisional of and claims the benefit of U.S. Provisional application 63/051,443, filed Jul. 14, 2020 which is hereby incorporated by reference in its entirety.

BACKGROUND OF THE INVENTION

1. Field of the Invention

The present disclosure relates to electrostatic actuators in general, and, more particularly, to electrostatic actuators suitable for use in exoskeletons, prosthetics, and vehicle propulsion

2. Description of the Related Art

Traditional robotic actuation is done via electric motors or pneumatics/hydraulics. Electromagnetic step motors offer precision, use a convenient form of power, and have some capability for miniaturization, making them the usual choice for small robots and prosthetics. However, these motors are actually electromagnetic (EM) motors, which require a strong magnetic field generated either by strong permanent magnets or solenoids running large currents. Conventional EM motors often choose the latter path and require significant power to operate, while generating excess heat.

Pneumatic systems provide more force in large systems, e.g., construction vehicles, industrial assembly lines, the US Army's Mule walking robot, etc., but they require compressors, an spring leaks, and output less force when scaled down for use in compact systems. Furthermore, complex fluid motions are difficult to achieve by pneumatics because pressure is typically either on or off, producing jerky choppy motion that may be acceptable in an industrial robot but impractical in exoskeletons, prosthetics, etc.

Due to these limitations, a wide range of applications requiring actuation, such as exoskeletal locomotion, walking robots, biomimetic underwater propulsion, prosthetics, medical servo-assists, and small-scale biomimetic robots, look to different actuation systems as a potential solution, including artificial muscles. Artificial muscles can be organized in several large groups: piezoelectrics, pneumatic artificial muscles (PAM), thermal actuators, and electroactive polymers (EAP).

Piezoelectric actuators offer large forces in small devices at low voltages, but the range of motion is very small. Devices are often stacked to mitigate that drawback. For example, such stacks are successfully used in the beam control circuitry of atomic force microscopes. However, the cost of individual devices and manufacturing difficulties severely limit the size of practical stacks, with the resulting overall elongation still being too small for typical artificial muscle applications.

PAMs, e.g., McKibben muscles, cloth muscles, and ratchet-integrated pneumatic actuators (RIPAs), employ a flexible bladder structure enmeshed in braided, crisscrossed, or wound fibers. As the bladder is filled with air, it deforms and displaces the fibers, outputting force. While possessing advantages in compactness and force output compared to piston system, PAMs use the same basic principles as hydraulics/pneumatics and thus suffer from the same basic limitations in unfavorable scaling and control issues.

Thermal actuation has also been proposed, e.g., with anisotropic materials that curl up with a temperature change, producing torsional artificial muscles and SMA (shape-memory alloys) muscles. Thermal expansion and contraction can generate high forces, but heat transfer severely limits the thermal actuators' response speed and cycling frequency. As a result, such actuators are not practical for most propulsion applications.

EAPs change shape under the influence of an applied electric field. They are considered closest to the biological muscles among all the above-mentioned approaches. They avoid the use of magnetic fields and thus avoid the concomitant limitations. However, EAP actuators are typically complicated heterogeneous materials that are difficult to fabricate and suffer from low reproducibility, very low efficiency, and low durability. As a result, they have proven very difficult to manufacture to the standards and at the scale and price-point required by practical applications.

Dielectric Elastomer Actuators (DEA) are a particular subclass of EAP, wherein the actuation is a result of the deformation of a polymer (elastomer) slab under the electrostatic force between the charges built on the slab's surfaces under applied voltage. That force is small macroscopically, but it scales as the inverse square of the separation between the plates. Hence, shrinking the devices to the microscale would gain a disproportionate increase in force. Arraying such devices in 3D should increase both force output and motion distance. However, manufacturing such arrays from traditional materials (e.g., metal electrodes and polymer dielectrics) by traditional manufacturing means (e.g. photolithography) to the necessary scale is impractical for reasons similar to the difficulties experienced with the piezoelectric and EAP approaches.

SUMMARY OF THE INVENTION

Embodiments described herein related to a microcapacitor array for providing artificial muscles. The microcapacitor array includes a dielectric body with electrode chambers, positive electrodes in positive electrode chambers, the positive electrodes being connected by a first set of channels in the dielectric frame; negative electrodes in negative electrode chambers, the negative electrodes being connected by a second set of channels in the dielectric frame. The first and second set of channels are arranged so that application of a voltage differential between the positive electrodes and the negative electrodes generates an attractive force between each set of adjacent positive and negative electrodes.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art since the principles of the present invention are defined herein specifically to provide electrostatic actuators.

Based on the issues described in the background above, the need for practical artificial muscles remains unmet. An alternative approach is described herein to address these issues. Embodiments herein combines electrostatic actuation with microfluidics, liquid electrodes, and additive manufacturing (AM). Calculations indicate that the described devices could generate up to 33 MPa stress under the current extreme limits of manufacture and materials. Software simulations of both individual devices and 2×2 arrays offer strong evidence for the feasibility of the proposed techniques. Parameter sweeps of the simulations offer insights into the behavior of the proposed devices as well as suggest optimal values maximizing device performance. These results allow for efficient design to maximize the generated output force density.

The 2×2 array simulations indicate different behaviors of the same devices based on different wiring schemes. These alternatives suggest muscle-like and counter-muscle-like actuations, leading to novel capabilities and applications.

Finally, the described features combined with the architectural flexibility of AM promise novel biomimetic actuators with the motion range, complexity, and dexterity potentially approaching those of biological muscles. These would be welcomed in a wide range of applications, e.g., high-fidelity prosthetics, ergonomic agile exoskeletons, all-terrain walkers, intuitive robotic controls, and stealthy undersea propulsion systems.

Figure 1:
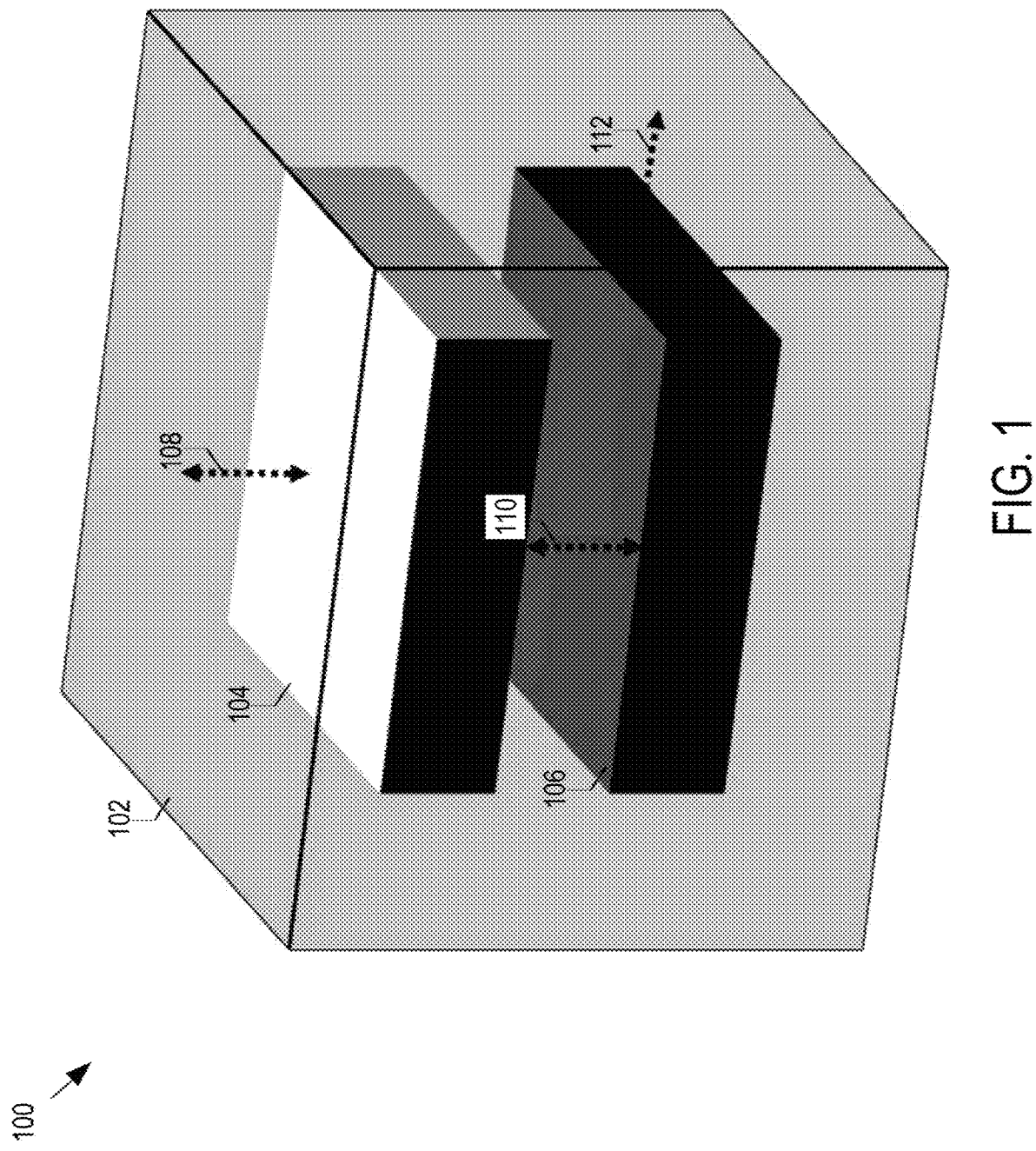
FIG. 1 shows a simple embodiment of a single microcapacitor embedded in surrounding bulk dielectric material.

The following definitions are used in this description:
Simulation software—a multiphysics simulation application (e.g., COMSOL) is used to generate the simulation models and parameter sweeps described herein.
Structures—the basic structures 100 of the simulation model included the overall bulk material polymer/dielectric 102 and two electrode chambers (104, 106) situated in parallel within the dielectric 102, as shown in FIG. 1. The three structures were joined together using a union function in the simulation software.
Material inputs—in one of example of the simulation, silicone (polydimethylsiloxane (PDMS)) was assigned to the bulk dielectric, and liquid water was assigned to the electrode chambers.
Node use—three physics nodes were used in the simulations: electrostatics, solid mechanics, and moving mesh. The solid mechanics node was applied to the bulk dielectric. The moving mesh node was applied to the electrode chambers. The electrostatics node was applied to all domains. Within the solid mechanics node, a fixed boundary node was applied to one side of the bulk dielectric that is parallel to the electrode plates, while the opposite side was allowed to deform. A boundary load was applied to all surfaces of the model with the outputs for each component force being equated to their respective Maxwell Upward Surface Tension Equations. The boundary node is key to the simulation working properly because it connects the physics nodes and allows for capacitive force reaction in the simulation.
Voltage setting—within the electrostatic node, a potential of 3000V was applied to all surfaces of one of the electrodes and a ground potential was applied to all surfaces of the other electrode.
Derived values—the total output force of embodiments described herein was calculated as the surface integral of the Von Mises Stress along the unconstrained outer surface of the embodiments, opposite to the boundary-constrained surface. The total deformed surface area was calculated as the surface integral of the area of the unconstrained outer surface of the embodiments, opposite the boundary constrained surface. The average output force density was calculated by dividing the total output force by the total deformed surface area.

Electrostatic actuation is based on plates of a charged capacitor exerting an attractive force on each other. That force is negligible for typical macroscale capacitors. However, the force is inversely proportional to the separation between the plate. Thus, miniaturizing the capacitors while arraying them in 3D structures should produce significant forces. Below is a back-of-the-envelope estimate for these forces.

The unit device can be thought of as a parallel-plate capacitor with ignored edge effects. From basic electrostatics, the electric field E generated in vacuum by one of the plates is:

$$E = \frac{\sigma}{2\varepsilon_0} = \frac{Q}{2\varepsilon_0 A} \qquad (1)$$

wherein $\sigma$ is the surface charge density, Q is the charge on the plate, and A is the area of the plate. This electric field would act on the charges in the other plate and produce a total force F on them given by:

$$F = QE = \frac{Q^2}{2\varepsilon_0 A} \qquad (2)$$

In the presence of a linear dielectric between the plates, this result gets adjusted by the respective dielectric constant $\varepsilon_r$, so:

$$F = QE = \frac{Q^2}{2\varepsilon_0 \varepsilon_r A} \qquad (3)$$

On the other hand, the capacitance of the parallel-plate capacitor filled with a linear dielectric is given by:

$$C = \frac{Q}{V} = \frac{\varepsilon_0 \varepsilon_r A}{D} \qquad (4)$$

wherein V is the applied voltage and D is the distance between the plates. Then:

$$F = \frac{Q^2}{2\varepsilon_0 \varepsilon_r A} = \frac{1}{2\varepsilon_0 \varepsilon_r A}\left(\frac{\varepsilon_0 \varepsilon_r AV}{D}\right)^2 = \frac{\varepsilon_0 \varepsilon_r AV^2}{2D^2} \qquad (5)$$

Since this estimate is for the lattice unit device in an array, the more relevant parameter here is the force density f, defined as the generated force per unit cross-sectional area, i.e.:

$$f = \frac{F}{A} = \frac{\varepsilon_0 \varepsilon_r A V^2}{2D^2 A} = \frac{\varepsilon_0 \varepsilon_r V^2}{2D^2} \quad (6)$$

Clearly, minimizing D would maximize f. Then manufacturability points to AM. Hence, the limit on D would stem from the best resolution of AM in acceptable materials. AM includes many fabrication methods, of which stereolithography (SLA) can yield both high resolution and functional product. The current resolution of top-of-the-line SLA printers is 10 µm.

Next, the allowed voltages are limited by the breach voltage of typical materials. For example, the breach voltage of some silicones is ~600 V/µm, it should be possible to set V to 5 kV for D=10 microns and still avoid breaching the dielectric. Finally, the dielectric constant for silicone is typically around 3. So:

$$f_{max} \cong \frac{\left(8.85 \times 10^{-12} \frac{F}{m}\right) \times 3 \times (5000\ V)^2}{2 \times (10 \times 10^{-6} m)^2} \cong \quad (7)$$

$$3.3 \times 10^7 \frac{N}{m^2} \cong 33\ MPa \cong 4{,}815\ psi$$

This estimate is a high upper bound, based on frontier values in SLA and dielectric breach fields. Even if more conservative values result in 10× reduction in force density, the system would still generate hundreds of pounds of force per square inch. This should be more than sufficient for most artificial muscle applications.

The electrostatic actuation idea itself is not new; however, combining electrostatic actuation with microfluidics and AM is novel. The basic idea is to AM-fabricate microfluidic devices in such a way that the channels would form wiring when filled with conducting fluid or gel, while the bulk of the material would serve both as the dielectric and as the mechanical medium of force transfer. This embodiment offers manufacturability, scalability, monolithic fabrication, parallelization, easy addressability, sufficient motion distance and force output, and biomimetic architectural flexibility. As a result, the proposed embodiment may be the only truly practical way of building artificial muscles.

Figure 2B:
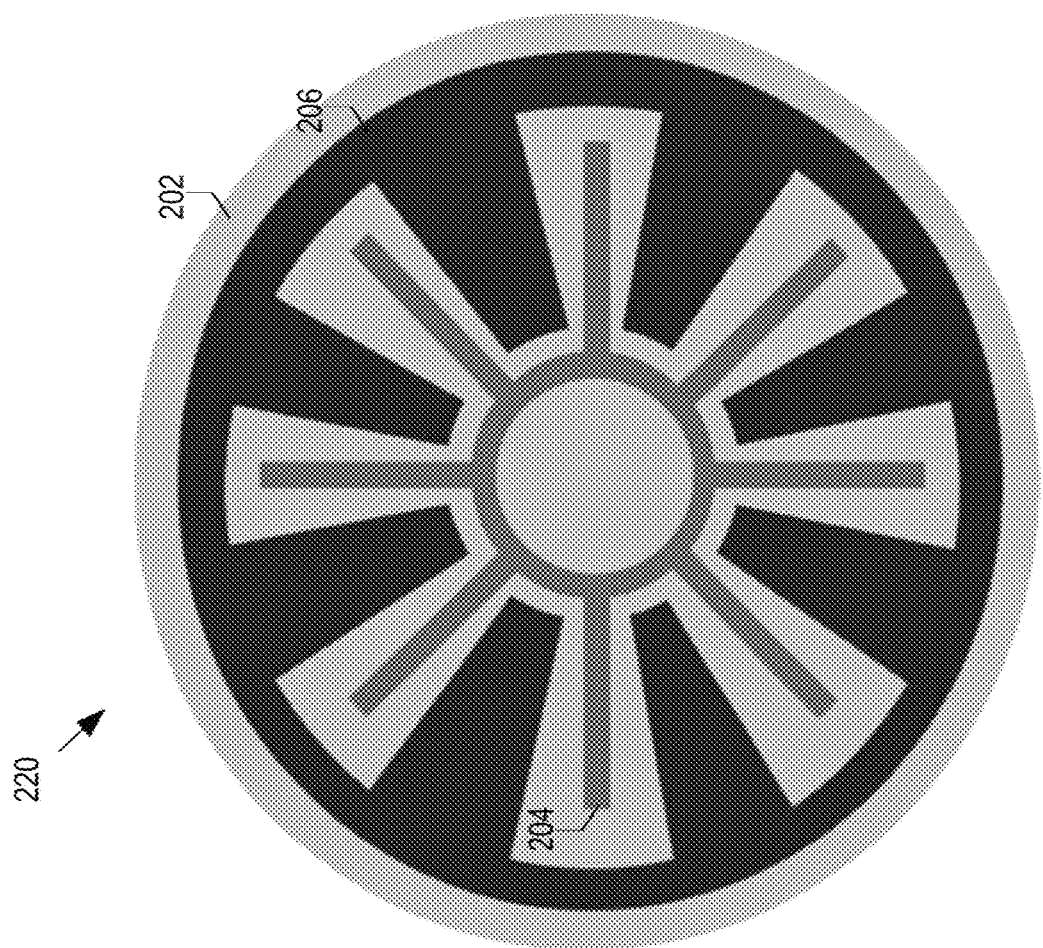
FIG. 2B shows a peristaltic pumping structure in accordance with embodiments.
Figure 2A:
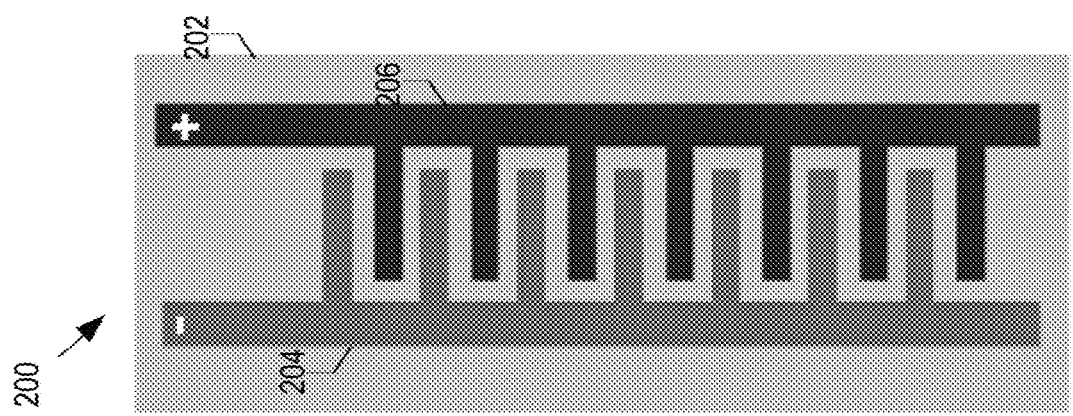
FIG. 2A shows an example embodiment that acts as an artificial muscle fiber.

A simple architecture exemplifying the proposed embodiment 200 is shown in FIG. 2A. The example embodiment 200 is essentially an artificial muscle fiber. The dielectric material 202 is built to include microchannels 204, 206 connected in two systems in a comb-line arrangement. The microchannels 204, 206 are subsequently filled with conducting fluid or gel. Then voltage is applied between the two systems 204, 206.

The shown geometry 200 produces an array of microcapacitors among the alternating prongs of the interdigitated combs 204, 206. Each microcapacitor generates an attractive force between its plates that contracts the dielectric pad between the plates of the respective microcapacitor. That contraction is transferred to the surrounding material 202. As a result, the overall structure 200 contracts along its longitudinal axis.

Each microcapacitor acts as a contracting spring, while the array 204, 206 acts as a chain of springs connected in series. The embodiment 200 would shrink longitudinally and apply a force to the outside world equal to the force generated in each microcapacitor. Each capacitor would shrink by a small distance, but the overall device would shrink by the cumulative distance and by the same percentage. So, longitudinal arraying increases the range of motion. The overall structure 200 acts as a muscle fiber.

Next, the fiber can be arrayed along the other two dimensions, i.e., laterally. The arrayed fibers then act as springs connected in parallel and output force equal to the sum of the forces contributed by the individual fibers. So, lateral arraying gains force. Thus, the fibers would act as a muscle fiber bundle, in direct analogy to human anatomy. FIG. 2A also shows why the force density is the correct parameter to calculate, as producing a desired force output is simply a matter of multiplying the force density by enough cross-sectional area.

The microscopic scale of the individual fiber allows an unprecedented flexibility in designing truly biomimetic architectures of force generation. For example, to produce a peristaltic pumping structure 220, it could be sufficient to organize the fibers concentrically, e.g., as shown in FIG. 2B.

Simulations—General Approach and Conventions

Software simulations were applied to study the projected behavior of the basic versions of such actuators with the objective of producing useful predictions for the optimal values of their geometric parameters before prototyping physical devices. To do so, several studies were generated, parametric sweeps were performed, and the output force density was plotted as a function of the varied parameter.

To limit the volume of the parametric space, certain conventions were adopted. The non-flexed lateral size of the electrode plates was kept at 400×400 µm. The non-flexed plate thickness was kept at 100 µm for each plate. The non-flexed separation between paired plates within the same microcapacitor was kept at 100 µm. While AM resolution approaches 10 m. 100 µm was selected to gain easier prototyping at the cost of lower force output.

The voltage applied between the electrodes was maintained at 3,000V. This ensures that even if the electrically induced deformation would significantly shrink the distance between the plates of the microcapacitor, the resulting field would still be well below the typical dielectric breach value of several hundred volts per micron. A boundary node was applied to the lower outer surface of the device, parallel to the electrode plates. This significantly simplified the calculations for simulation software while still producing valid results.

Simulations of a Single Microcapacitor

The simplest embodiment 100 to consider is a single microcapacitor 104, 106 embedded in surrounding bulk dielectric material 102, e.g., as shown in FIG. 1. The embodiment 100 shows the thickness 108 ("c") of the bulk material 102 above the top plate 104 and below the bottom plate 106, the separation 110 ("D") between the plates 104, 106, and the width 112 ("e") of the bulk material 102 region surrounding the plates 104, 106 along both horizontal axes.

Software simulation results were obtained for when the embodiment 100 flexed under 3,000V applied between the plates 104, 106. The imposed boundary conditions fixed the bottom surface of the device to remain flat. The simulation demonstrated an interesting beneficial feature of the system. As the material 102 flexes under the applied voltage, the distance D between the plates 104, 106 roughly halves, in essence improving the achieved effective fabrication resolution by a factor of two. Due to the inverse square dependence of the plate force on D, the electrostatic force between the plates 104, 106 would roughly quadruple. This means that the limit on the achievable output force density would be roughly quadruple as well, compared to the limit set by the SLA resolution of non-flexed structures. Thus, the embodiment 100 has a reactive feature that dramatically improves the performance of the overall device as contraction increases. While this effect is expected from first principles, the software simulations confirm it and estimate it quantitatively.

The actuation process can be viewed into two parts: force generation and force transfer. The force is proportional to the total area of the microcapacitor plates 104, 106. Hence, maximizing the plate share of the device cross-section area would maximize the generated force. On the other hand, force transfer is more efficient when there is more material 102 on the lateral sides of the plates 104, 106, likely with diminishing returns beyond a certain thickness. The biological analogy is muscles and tendons, respectively. Both need to be present for effectual actuation.

As both generation and transfer compete for the available cross-section area, while they work together to output macroscopic force, there should be a golden point of optimal tradeoff that maximizes the outputted force density. Determining that point should be highly beneficial to device design, as it would bring the prototype parameters close to the optimal values and thus minimize the scope of the subsequent experimental optimizations.

Hence, a parameter sweep was conducted over the width of the bulk material region 102 surrounding the plates 104, 106 along both horizontal axes for the simple embodiment 100. This parameter "e" was swept from 100 µm to 400 µm, in steps of 10 µm. This kept the muscle area constant while the tendon area was allowed to increase in steps. Simultaneously, the thickness of the bulk polymer between the outer top surface of the device and the top plate 104 was the kept at c=50 µm, the same as the thickness between the bottom surface of the device and the bottom plate 106. The value for c was selected as half the conventional plate separation, to allow for efficient subsequent arraying of the basic device. For every value of e in the swept set, the simulation calculated the output force by integrating the stress over the top surface of the device, and then calculated the force density by dividing that force by the total area of the top surface.

As expected, increasing tendon width increased the output force, while the force generation area was kept constant. This confirms that force transfer improves with e. Also, there is a saturation point, perhaps around e=310 µm. As expected from the tradeoff between generation and transfer, the sweep showed that the outputted force density indeed reaches a peak, specifically at around e=220 µm. Both identified values of e (transfer saturation and peak force density) are important to know in future design.

The simulation indicates a peak force density f=1.44 kPa. The original back-of-the-envelope calculations were done based on 10 µm plate separation and applied voltage of 5 kV, to estimate an upper bound. On the other hand, the simulation was based on a more conservative choice of input parameters (100 µm and 3 kV), to facilitate prototyping and experimental testing. So, the calculation should be redone:

$$f_{sim} \cong \frac{\left(8.85 \times 10^{-12} \frac{F}{m}\right) \times 3 \times (3000 \ V)^2}{2 \times (100 \times 10^{-6} m)^2} \cong 11948 \frac{N}{m^2} \cong 12 \ \text{kPa} \quad (8)$$

The above assumes 100% muscle. At e=220 µm, only about a fifth of the area is muscle. Hence, only a fifth of the above value, or ~2.4 kPa, should be expected. That is less than a factor of two away from the software simulation result. Considering the roughness of the back-of-the-envelope estimate, this is a reasonable agreement.

In the above simulation, the thickness "c" of the bulk material 102 above the top plate 104 and below the bottom plate 106 was set at 50 µm. That value was picked as it is optimal for efficient longitudinal arraying with 100 µm plate separation. However, it remained to be determined what that setting meant for force output. Hence, c was swept next from 50 µm to 400 µm, while keeping e=220 µm (the apparent optimal value).

The force density starts at ~1.44 kPa at c=50 µm, then rapidly declines, then asymptotically settles at ~400 Pa for large c. This makes sense as increasing c makes the material 102 thicker above and below the microcapacitor 104, 106. So, the same force applied to a thicker slab will result in less deformation. Less deformation means the flexed plates 104, 106 narrow the plate separation less, which means less electrostatic force is generated at the same voltage. At c=50 µm, D is roughly halved from its non-flexed value, so (as the electrostatic force is inverse quadratic in D) the force should be roughly quadrupled with respect to its value for non-flexed D. Indeed, the maximal and asymptotic values of the force density in the c sweep are roughly 4× apart, i.e., consistent with small deformations at large c. The conclusion is that c=50 µm is the optimal value for force density maximization in this geometry.

Simulations with 2×2 Array of Microcapacitors

The next logical step was to array 4 microcapacitors in a 2×2 formation, in the plane parallel to the plates. In such a structure, there are two obvious choices for polarity: planar) all top plates have the same polarity and all the bottom plates have the opposite polarity, resulting in a planar alternation pattern; checkered) alternate polarity in a checkered formation, e.g., bottom distal left, bottom proximal right, top proximal left, and top distal right plate have all the same polarity, while the other four all hold opposite polarity.

Figure 3B:
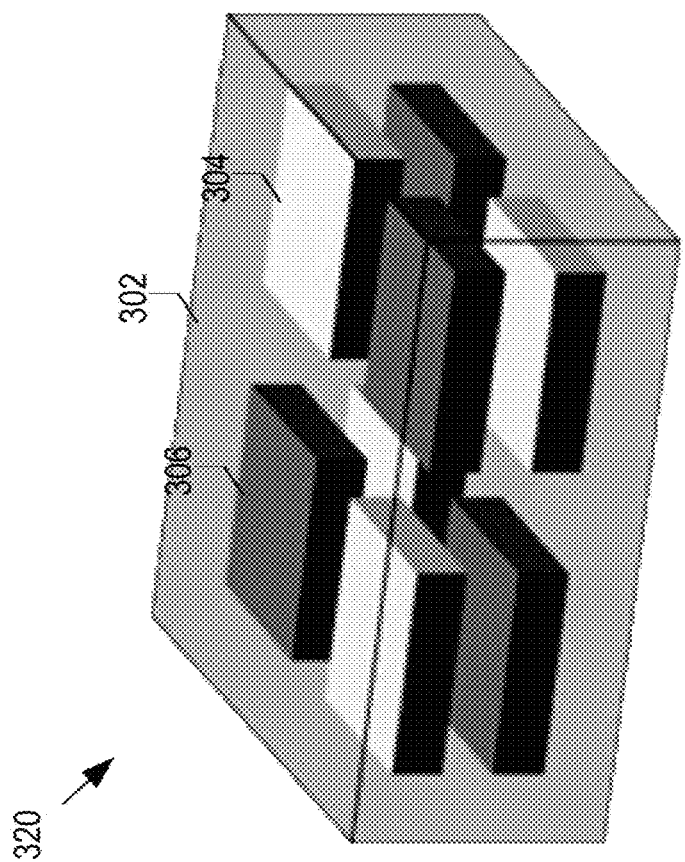
FIGS. 3A, 3B show a planar and checkered configuration, respectively, of polarity for a microcapacitor array in accordance with embodiments.
Figure 3A:
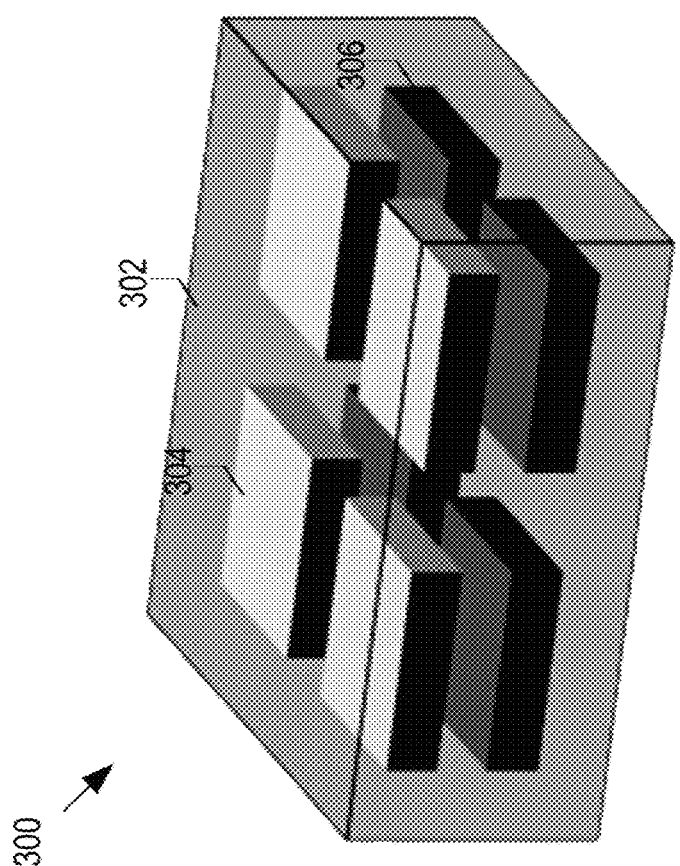

FIGS. 3A, 3B show planar 300 and checkered 320 configurations, respectively, of polarity of a microcapacitor array. Simulation results were obtained for the planar 300 and checkered 320 configurations with the distance h between the microcapacitors 304, 306, in this example, set to 60 µm along both horizontal axes. Based on the previous simulations, the side width and vertical slab width were set to their apparent optimal values of e=220 µm and c=50 µm.

In the planar configuration 300 of FIG. 3A, there is noticeably less bulging of the plates 302 in the inward area (i.e., between capacitors 304, 306) when a voltage differential is applied than in the corresponding area of the same capacitors on the outward side of the array. Simultaneously, that outward side shows similar behavior to the single microcapacitor of FIG. 1. This suggests an unexpected benefit to the arraying in the horizontal plane with planar wiring 300-the neighboring capacitors 304, 306 seem to decrease each other's deformation around the edges. That would likely help flatten the non-linear response of the device to applied voltage and ultimately offer easier control. Finally, the array 304, 306 behaves as desired in the vertical direction, showing significant contraction. This suggests that when arrayed laterally, the planar formation would produce correct behavior of the overall device 300 at the macroscale.

In the checkered wiring of FIG. 3B, there is a large bulge in the center due to the attraction between neighboring plates 302 when a voltage differential is applied. In some cases, this bulge is opposite to the desired behavior as it would produce expansion instead of contraction in the longitudinal direction of the muscle fiber. However, while undesirable for contractive actuation, this phenomenon may potentially produce expansive actuation instead, i.e., a form of counter-muscle.

The 2×2 array simulations were repeated to parameter sweep h from 50 μm to 400 μm in steps of 10 μm. As mentioned above, h is the horizontal distance between neighboring microcapacitors 304, 306 in the array. The interchangeability of the two horizontal axes suggested that the two distances would be kept equal to the same h, while sweeping h itself.

As expected, the simulation results show that the force densities of both configurations decrease with increasing h, since a decreasing percentage of the total area is devoted to force generation. The decrease in force density is far steeper in the checkered configuration since in its case the deformations along the horizontal axes are far more pronounced. In both configurations, force density is maximal for the minimal h=50 μm.

These results also suggest that the e parameter may not be optimal at 220 μm when multiple microcapacitors are arrayed laterally. If two microcapacitors maximize output force density for h=50 μm, it stands to reason that that should be the chosen spacing to use in further arraying.

The maximal output force density increases from 1.44 kPa for the single microcapacitor, to 1.79 kPa for the 2×2 array. That suggests further increase in output force density as more microcapacitors 304, 306 are arrayed laterally.

Analysis of Range of Motion

The adult human bicep produces approximate strain ~15%. Such strain cannot be achieved by relatively hard materials such as silicon, metals, or piezoelectrics; only softer materials can do it. In a sense, people can move around as they do only because their muscles are mostly water. To produce life-like agility and range of motion, artificial muscles should offer comparable elongation and strain.

The single micro-capacitor (FIG. 1) simulation produced ~50 μm contraction over a 400 μm starting thickness, or ~12.5% strain. The simulation of a 2×2 array with planar wiring (300 of FIG. 3A) produced ~40 μm contraction over a 400 μm starting thickness, or ~10% strain. The simulation of a 2×2 array with checkered wiring (320 of FIG. 3B) produced ~80 μm expansion over a 400 μm starting thickness, or ~20% strain. Hence, the strain results from the proposed devices are comparable to the human bicep strain. This is evidence of the applicability of the proposed technology.

Future Work

The size of the simulated array should be increased in both the longitudinal and lateral axes. The parameter e would then become less important as an edge effect of decreasing overall impact. Parameter h is likely optimized at half the plate thickness. Parameter h will remain important as the array grows. Simulations of larger arrays will need parameter sweeps in h.

Symmetry arguments suggest that the boundary conditions on the bottom of the device will remain valid and useful regardless of the size of the array. That boundary surface can be regarded as the plane of mirror symmetry passing through the middle of an actual macroscopic device. The middle should not bend at all, since symmetry dictates it should experience equal and opposite forces along the longitudinal axis at every point of the surface.

As the simulated array grows, the calculated maximal force density in each h sweep ought to converge to a set number. That number should be a good estimate of the force density output of a macroscopic prototype of the same geometry and dimensions. Once that force density is determined, the cross-sectional area can be calculated as necessary to achieve a desired force output.

Finally, improvements of fabrication capability would necessitate changes in the picked conventional parameters and iteration of the parameter sweeps to recalculate the optimal values before prototyping.

Potential Applications

Biomimetic reactive propulsion. The overall structure 220 in FIG. 2B shrinks concentrically like a bladder, like the way squids and octopi expel water from their body cavity to achieve reactive propulsion. This may offer a biomimetic method of propulsion for unmanned underwater vehicles (UUV). Such propulsion would produce no cavitation and would look and sound like a biological, thereby offering stealth.

Biomimetic fin propulsion. Pelagic fish propel themselves to high velocity by the slow motion of a large back fin that displaces large amounts of water. As the individual points on the fin do not travel fast enough, they do not cavitate like traditional high-speed propellers. If artificial muscles are constructed appropriately and installed in UUV's following the anatomy of pelagic fish, the UUV's would move and sound like a biological of similar size. The result would be stealthy propulsion for the UUV's.

Acoustic translucence. Replacing electromagnetic motors with polymer artificial muscles would decrease the effective density of the propulsion module from around 9 g/cm3 to around 1 g/cm3. If this is combined with switching to polymer or plastic hull, the same should be true for the overall craft. Since the intensity of reflected sonic waves depends on the density mismatch between water and the material of the craft, the switch should allow for sonar beams to pass through the craft, for the most part. As a result, much less energy is reflected towards the source. The result is an acoustically translucent craft that appears to sonar to be a biological of similar size.

Rotational actuation. In principle, the muscle fibers can also be arranged in macroscopic helical structures akin to the human forearm muscles that allow for axial rotation of the wrist with respect to the elbow. Contraction of a helical fiber bundle will produce a torque that can be used for rotational actuation.

Exoskeletal locomotion. Modern personal armor offers effective protection at the price of high weight. A modern infantryman with combat load approaching 90 lbs. tends to sacrifice protection to retain mobility. The solution can be an armored self-propelled exoskeleton ("powered armor"). Artificial muscles offer a pathway to that goal. Their architectural flexibility means they can be built to follow human anatomy explicitly, thereby offering a similar range of motion to the exoskeleton and highly intuitive efficient controls to the wearer. Essentially, the artificial muscles outside could mimic the motion of the human muscles within. That would simplify training, increase precision, decrease fatigue, and allow for complex motions and combat techniques that would be inaccessible by other types of actuators. Once developed, powered armor would revolutionize ground combat particularly in dense terrain, urban environments, ship boarding, and breach actions. The same locomotion technology would also be useful in servo-assists to the elderly and incapacitated, and as a fatigue-reducer to lightly equipped troops and physical workers.

Ground walker vehicles. Mines and improvised explosive devices (IEDs) pose a persistent threat to ground vehicles. Typical solutions involve heavily armored V-shaped bottom and increased ground clearance to reduce the damage effects. However, that approach produces heavy expensive vehicles. Artificial muscles may offer an alternative solution. A ground walker vehicle (e.g., with 8, 10, or 12 long legs) could ensure very high ground clearance reducing the need for heavy armor on the bottom and lightening the vehicle. Furthermore, such a walker retains effectiveness even after the loss of some of the mechanical limbs. Moreover, such legs would provide variable ground clearance offering unmatched cross-country maneuverability and superior ability to take advantage of cover. Thus, artificial muscles could be the pathway to the next generation of military ground all-terrain vehicles, e.g., recce vehicles and armored personnel carriers.

Alternating actuators. Biological muscles can only contract. So, reverse motion is achieved by another contracting muscle acting from the opposite side of a joint, e.g., as in the human biceptricep system. In contrast, the described devices can produce muscle and countermuscle motion, e.g., by using the two polarity configurations described above. This is a potentially very useful feature, as it would be an efficient way to build alternating-motion actuators while circumventing the typical need for a joint.

Artificial muscles based on microfluidics, arrayed microcapacitors, electrostatic forces, and AM, have been described and analyzed. Calculations indicate 33 MPa achievable stress. Software simulations and parameter sweeps of a single device and a 2×2 array indicate 10-20% strain and optimal parameter values to maximize output force density. Alternative wiring schemes of the same array show muscle-like and counter-muscle-like behaviors, offering novel capabilities for building actuators. The proposed technology promises a major impact on a range of applications, e.g., exoskeletal locomotion, prosthetics, servo-assists, walker all-terrain vehicles, and stealthy biomimetic underwater propulsion.

This description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention, and it is not intended to be exhaustive or limit the invention to the precise form disclosed. Numerous modifications and alternative arrangements may be devised by those skilled in the art in light of the above teachings without departing from the spirit and scope of the present invention.

What is claimed is:

1. A microcapacitor array for providing artificial muscles, the microcapacitor array comprising:
    a dielectric body with at least four electrode chambers;
    at least two positive electrodes in at least two positive chambers of the at least four electrode chambers, the at least two positive electrodes being connected by a first plurality of channels in the dielectric frame; and
    at least two negative electrodes in at least two negative chambers of the at least four electrode chambers, the at least two negative electrodes being connected by a second plurality of channels in the dielectric frame;
    wherein the first and second plurality of channels are arranged such that application of a voltage differential between the at least two positive electrodes and the at least two negative electrodes generates an attractive force between each set of adjacent positive and negative electrodes in the at least two positive and at least two negative electrodes.

2. The microcapacitor array of claim 1, wherein the at least two positive chambers are arranged in a first plane and the at least two negative chambers are arranged in a second plane, and wherein the first and second planes are substantially parallel.

3. The microcapacitor array of claim 2, wherein the attractive force generates longitudinal contraction and lateral expansion with respect to an axis perpendicular to the first and second planes.

4. The microcapacitor array of claim 3, wherein the longitudinal contraction produces muscle-like action in the microcapacitor array.

5. The microcapacitor array of claim 1, wherein the at least two positive and at least two negative chambers are arranged in a first plane and a second plane so that all adjacent chambers have opposite polarity, and wherein the first and second planes are substantially parallel.

6. The microcapacitor array of claim 5, wherein the attractive force generates longitudinal expansion and lateral contraction with respect to an axis perpendicular to the first and second planes.

7. The microcapacitor array of claim 6, wherein the longitudinal expansion produces counter-muscle-like action.

8. The microcapacitor array of claim 1, wherein the at least two positive and at least two negative chambers are arranged in a first plane and a second plane so that adjacent chambers in each of the first and second planes are approximately separated by a target horizontal distance, and wherein the first and second planes are substantially parallel, and wherein the target horizontal distance is specified by iteratively simulating the application of the voltage differential to maximize a force density of the attractive force.

9. The microcapacitor array of claim 8, wherein the target horizontal distance is approximately 50 μm.

10. The microcapacitor array of claim 1, wherein the at least two positive and at least two negative chambers are arranged in a first plane and a second plane that are substantially parallel, and wherein a target plate thickness of each of the first and second plates is specified by iteratively simulating the application of the voltage differential to maximize a force density of the attractive force.

11. The microcapacitor array of claim 10, wherein the target plate thickness is approximately 100 μm.

12. The microcapacitor array of claim 1, wherein the at least two positive and at least two negative chambers are arranged in a first plane and a second plane that are substantially parallel, wherein a target longitudinal distance between adjacent chambers in different planes is specified by iteratively simulating the application of the voltage differential to maximize a force density of the attractive force.

13. The microcapacitor array of claim 12, wherein the target longitudinal distance is approximately 100 μm.

14. A microcapacitor array for providing artificial muscles, the microcapacitor array comprising:
    a dielectric body with at least eight electrode chambers;
    at least four positive electrodes in at least four positive chambers of the at least eight electrode chambers, the at least four positive electrodes being connected by a first plurality of channels in the dielectric frame;
    at least four negative electrodes in at least four negative chambers of the at least eight electrode chambers, the at least four negative electrodes being connected by a second plurality of channels in the dielectric frame;

a first grouping of chambers, wherein at least two positive chambers are arranged within the first longitudinal area in a first plane and at least two negative chambers are arranged in a second plane within the first grouping of chambers, and wherein the first and second planes are substantially parallel; and a second grouping of chambers, wherein at least two positive chambers and at least two negative chambers are arranged within the first and second planes so that all adjacent chambers in the second grouping of chambers have opposite polarity;

wherein the first and second plurality of channels are arranged such that application of a voltage differential between the at least four positive electrodes and the at least four negative electrodes generates an attractive force between each set of adjacent positive and negative electrodes in the at least two positive and at least two negative electrodes.

15. The microcapacitor array of claim 14, wherein the attractive force in the first grouping of chambers generates longitudinal contraction and lateral expansion with respect to an axis perpendicular to the first and second planes, and wherein the longitudinal contraction produces muscle-like action in the microcapacitor array.

16. The microcapacitor array of claim 15, wherein the attractive force in the second grouping of chambers generates longitudinal expansion and lateral contraction with respect to the axis perpendicular to the first and second planes, and wherein the longitudinal expansion produces counter-muscle-like action.

17. The microcapacitor array of claim 16, wherein the muscle-like action and counter-muscle-like action can be combined to provide for powered motion in each of the longitudinal expansion and the longitudinal contraction.

18. The microcapacitor array of claim 17, wherein the powered motion in each of the longitudinal expansion and the longitudinal contraction is provided without using a joint.

* * * * *